(12) United States Patent
Crawford

(10) Patent No.: US 10,514,004 B2
(45) Date of Patent: Dec. 24, 2019

(54) CASCADE ASSEMBLY FOR A THRUST REVERSER OF AN AIRCRAFT NACELLE

(71) Applicant: Rohr, Inc., Chula Vista, CA (US)

(72) Inventor: Sara Christine Crawford, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 728 days.

(21) Appl. No.: 14/968,389

(22) Filed: Dec. 14, 2015

(65) Prior Publication Data

US 2017/0167439 A1    Jun. 15, 2017

(51) Int. Cl.
| | |
|---|---|
| F02K 1/72 | (2006.01) |
| F01D 25/24 | (2006.01) |
| F02K 1/76 | (2006.01) |
| F02K 3/06 | (2006.01) |
| F04D 29/52 | (2006.01) |
| F02K 1/60 | (2006.01) |
| F02K 1/62 | (2006.01) |

(52) U.S. Cl.
CPC ............... *F02K 1/72* (2013.01); *F01D 25/24* (2013.01); *F02K 1/605* (2013.01); *F02K 1/625* (2013.01); *F02K 1/766* (2013.01); *F02K 3/06* (2013.01); *F04D 29/522* (2013.01); *F05D 2220/36* (2013.01); *F05D 2240/129* (2013.01); *F05D 2260/36* (2013.01)

(58) Field of Classification Search
CPC . F02K 1/72; F02K 1/625; F02K 1/766; F02K 1/805; F05D 2240/129
See application file for complete search history.

(56) References Cited

U.S. PATENT DOCUMENTS

| | | | |
|---|---|---|---|
| 5,778,659 A | 7/1998 | Duesler et al. | |
| 5,897,120 A * | 4/1999 | Scavo | F16J 15/122 239/265.35 |
| 8,127,532 B2 | 3/2012 | Howe | |
| 8,201,390 B2 | 6/2012 | Sternberger | |
| 8,899,013 B2 | 12/2014 | Hurlin et al. | |
| 9,068,532 B2 | 6/2015 | Gromley | |
| 2008/0271432 A1* | 11/2008 | Tsou | F02K 1/72 60/226.2 |
| 2009/0016890 A1* | 1/2009 | Douguet | F01D 5/3007 416/219 R |
| 2014/0027537 A1 | 1/2014 | Binks et al. | |
| 2014/0319243 A1* | 10/2014 | Caruel | F02K 1/09 239/265.19 |

(Continued)

FOREIGN PATENT DOCUMENTS

WO    2015028755 A1    3/2015

OTHER PUBLICATIONS

Extended European Search report for application No. 16204060.4-1607 dated Apr. 13, 2017 (7 pages).

*Primary Examiner* — Andrew H Nguyen
(74) *Attorney, Agent, or Firm* — Cantor Colburn LLP

(57) ABSTRACT

A cascade assembly of a nacelle for a turbofan engine includes a one-piece cascade fixed to a translating sleeve constructed and arranged to move between forward and aft positions along a centerline. A hook device of the cascade assembly includes a first catch fixed to a stationary structure and a second catch fixed to the one-piece cascade. The first catch is adapted to mate with the second catch for translating load when the cascade assembly is in a deployed state and the translating sleeve is in the aft position.

13 Claims, 5 Drawing Sheets

(56) References Cited

U.S. PATENT DOCUMENTS

| | | |
|---|---|---|
| 2014/0325957 A1 | 11/2014 | Aten |
| 2015/0204272 A1 | 7/2015 | James |
| 2015/0260126 A1* | 9/2015 | Caruel .................. B64D 29/08 239/265.19 |
| 2015/0308379 A1 | 10/2015 | James |
| 2016/0273487 A1* | 9/2016 | Vauchel ................... F02K 1/72 |

* cited by examiner

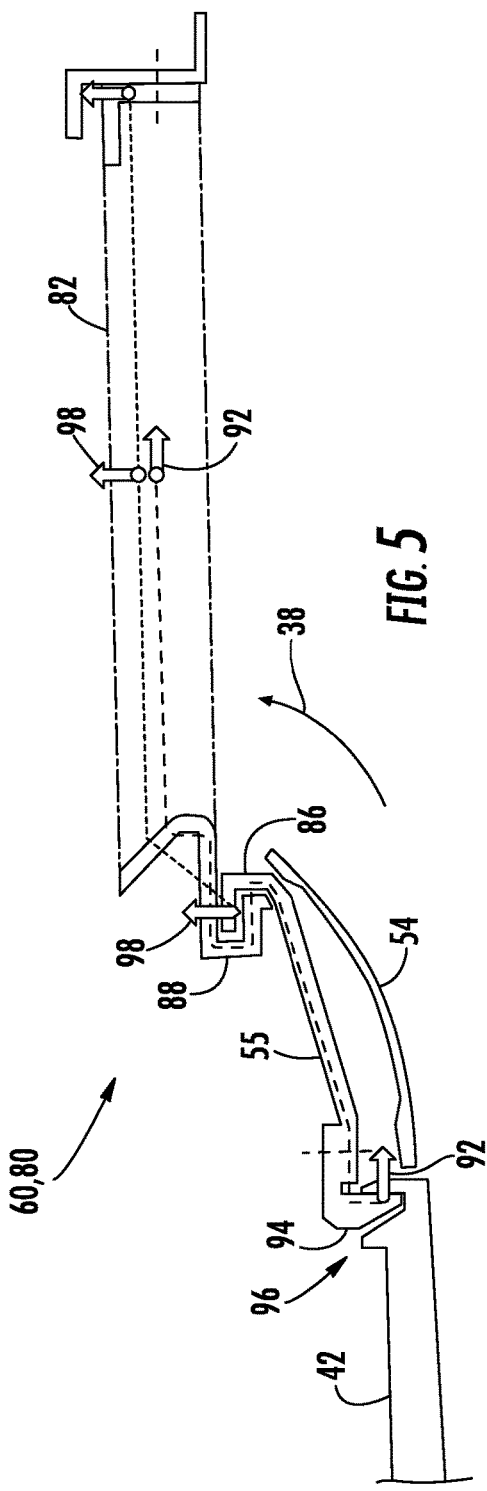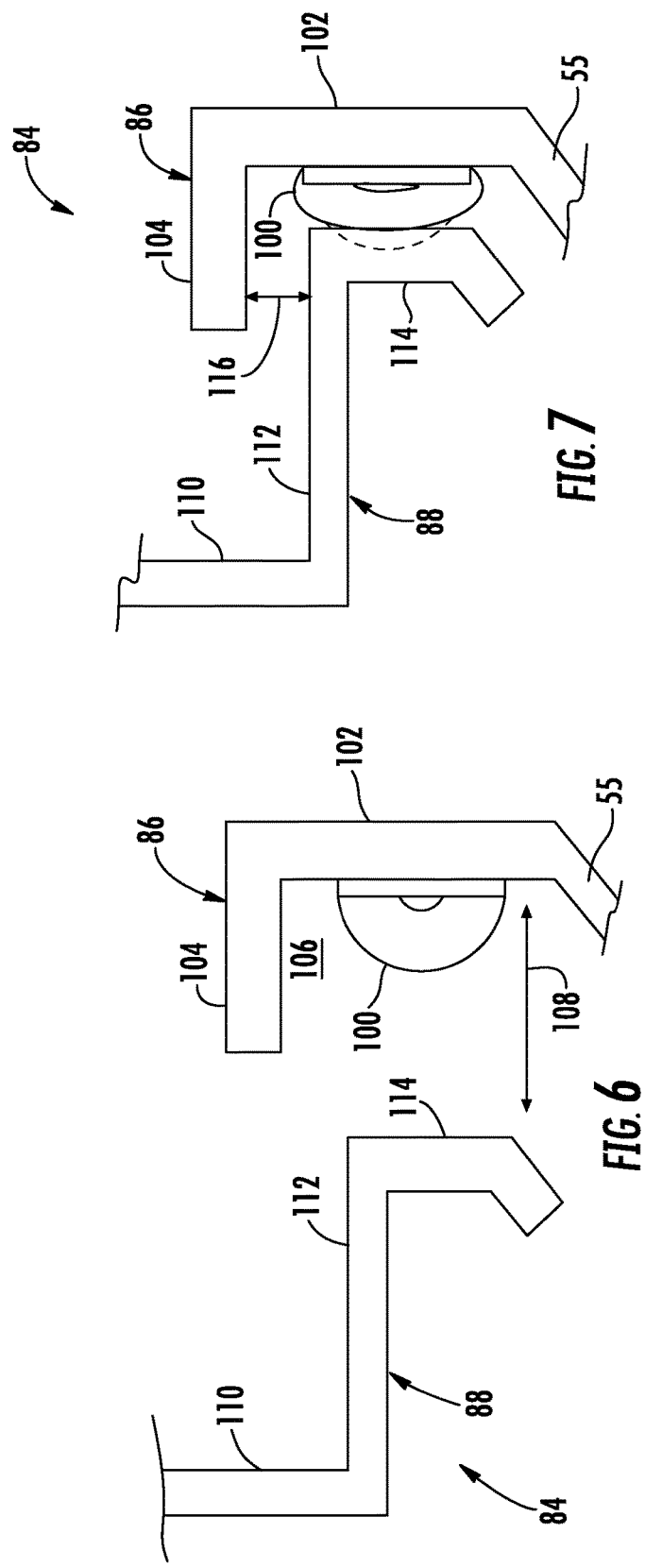

CASCADE ASSEMBLY FOR A THRUST REVERSER OF AN AIRCRAFT NACELLE

BACKGROUND

The present disclosure relates to a thrust reverser of an aircraft nacelle, and more particularly, to a cascade assembly of the thrust reverser.

Jet powered aircraft employ thrust reversers to reduce aircraft speed during landing. Thrust reversers generally expel fan bypass airflow in a forward direction to create reverse thrust. The thrust reversers typically employ cascades to direct the exhausted fan bypass airflow. In some thrust reverser designs, the array of cascades may translate from a stowed position rearward to a deployed position. In such thrust reverser designs, there is a need for effective load paths to react loads on the cascade array.

SUMMARY

A cascade assembly of a nacelle for a turbofan engine according to one, non-limiting, embodiment of the present disclosure includes a one-piece cascade fixed to a translating sleeve constructed and arranged to move between forward and aft positions along a centerline; a stationary structure; and a hook device including a first catch fixed to the stationary structure and a second catch fixed to the one-piece cascade, and wherein the first catch mates to the second catch for translating load when the cascade assembly is in a deployed state and the translating sleeve is in the aft position.

Additionally to the foregoing embodiment, the stationary structure includes a fan case.

In the alternative or additionally thereto, in the foregoing embodiment, the cascade assembly is in a stowed state when the translating sleeve is in the forward position resulting in the second catch being axially spaced forward of the first catch.

In the alternative or additionally thereto, in the foregoing embodiment, the hook device includes a resiliently compliant member disposed between the first and second catches.

In the alternative or additionally thereto, in the foregoing embodiment, the resiliently compliant member is engaged to the first catch, is in biased contact with the second catch when the cascade assembly is in the deployed state, and is spaced from the second catch when the cascade assembly is in the stowed state.

In the alternative or additionally thereto, in the foregoing embodiment, the stationary structure includes a shear web projecting at least in-part axially rearward from the fan case and the first catch is engaged to the shear web.

In the alternative or additionally thereto, in the foregoing embodiment, the first catch includes a first portion projecting radially outward from the fixed structure and a second portion projecting axially forward from the first portion, the first and second portions defining at least in-part a channel, and wherein the second catch includes a first segment projecting radially inward from the one-piece cascade and a second segment projecting axially aft of the first segment such that the second segment is disposed in the channel when the cascade assembly is in the deployed state.

In the alternative or additionally thereto, in the foregoing embodiment, the hook device includes a resiliently compliant member disposed axially between the first portion and the first segment.

In the alternative or additionally thereto, in the foregoing embodiment, the first and second catches are circumferentially continuous.

In the alternative or additionally thereto, in the foregoing embodiment, the first and second catches are circumferentially discontinuous.

In the alternative or additionally thereto, in the foregoing embodiment, the one-piece cascade is disposed axially forward of the translating sleeve when the cascade assembly in the stowed and deployed states.

In the alternative or additionally thereto, in the foregoing embodiment, the second catch includes a an enlarged head disposed radially inward of the cascade and a neck projecting between and engaged to the cascade and the enlarged head, ad wherein the first catch includes a first portion projecting radially outward from the fixed structure, a second portion projecting axially forward from the first portion, and a slot in the second portion for receipt of the neck when the cascade assembly is in the deployed state.

A thrust reverser of an aircraft nacelle according to another, non-limiting, embodiment includes a translating sleeve constructed and arranged to move between forward and aft positions along a centerline; a blocker door configured to redirect airflow in a fan bypass duct, and wherein the blocker door is deployable when the translating sleeve is in the aft position; and a cascade assembly including a cascade fixed to the translating sleeve, a stationary shear web, and a hook device including a first catch fixed to the shear web and a second catch fixed to the cascade, and wherein the first catch mates to the second catch for translating load when the cascade assembly is in a deployed state and the translating sleeve is in the aft position.

Additionally to the foregoing embodiment, the hook device includes a resiliently compliant member disposed between the first and second catches.

In the alternative or additionally thereto, in the foregoing embodiment, the shear web projects axially aft from a fan case.

In the alternative or additionally thereto, in the foregoing embodiment, the cascade assembly is in a stowed state when the translating sleeve is in the forward position resulting in the second catch being axially spaced forward from the first catch, and wherein the one-piece cascade is disposed axially forward of the translating sleeve when the cascade assembly is in the stowed and deployed states.

In the alternative or additionally thereto, in the foregoing embodiment, the hook device includes a resiliently compliant member disposed between the first and second catches, and wherein the resiliently compliant member is engaged to the first catch, is in biased contact with the second catch when the cascade assembly is in the deployed state, and is spaced from the second catch when the cascade assembly is in the stowed state.

In the alternative or additionally thereto, in the foregoing embodiment, the first catch includes a first portion projecting radially outward from the fixed structure and a second portion projecting axially forward from the first portion, the first and second portions defining at least in-part a channel, and wherein the second catch includes a first segment projecting radially inward from the one-piece cascade and a second segment projecting axially aft of the first segment such that the second segment is disposed in the channel when the cascade assembly is in the deployed state.

In the alternative or additionally thereto, in the foregoing embodiment, the second catch includes a an enlarged head disposed radially inward of the cascade and a neck projecting between and engaged to the cascade and the enlarged head, ad wherein the first catch includes a first portion projecting radially outward from the fixed structure, a second portion projecting axially forward from the first portion, and a slot in the second portion for receipt of the neck when the cascade assembly is in the deployed state.

In the alternative or additionally thereto, in the foregoing embodiment, the blocker door is substantially disposed aft of the cascade assembly when the translating sleeve is in the forward and aft positions.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 5 is a partial cross section of a cascade assembly of the thrust reverser in the deployed state;

FIG. 6 is a partial cross section of a hook device of the cascade assembly in a partially deployed state;

FIG. 7 is a partial cross section of the hook device in a partially deployed state;

DETAILED DESCRIPTION

Figure 1:
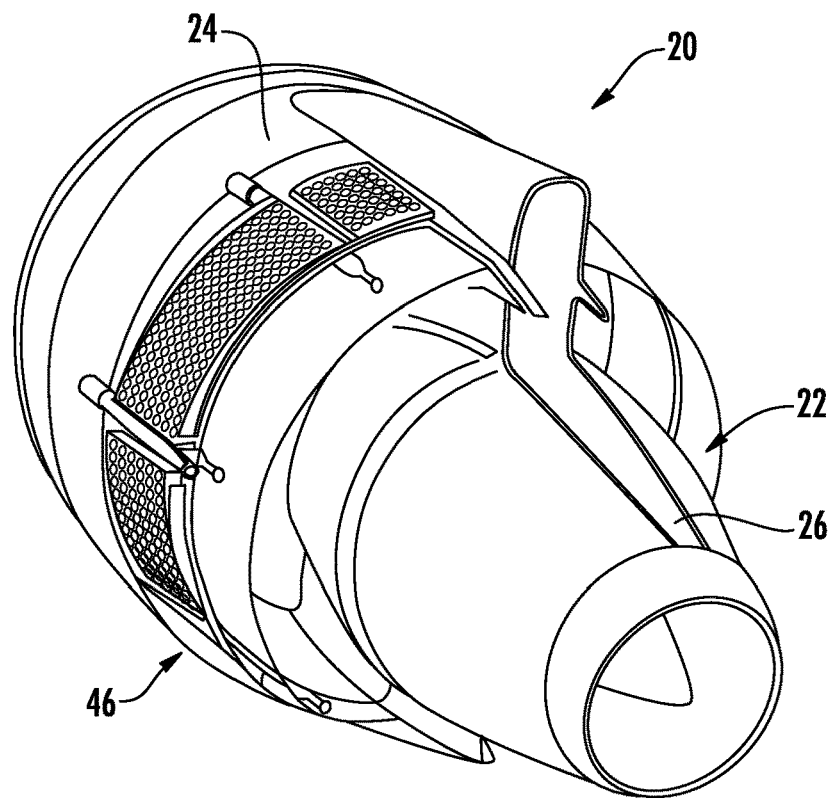
FIG. 1 is a perspective view of a turbofan engine as one, non-limiting, application of the present disclosure.
Figure 2:
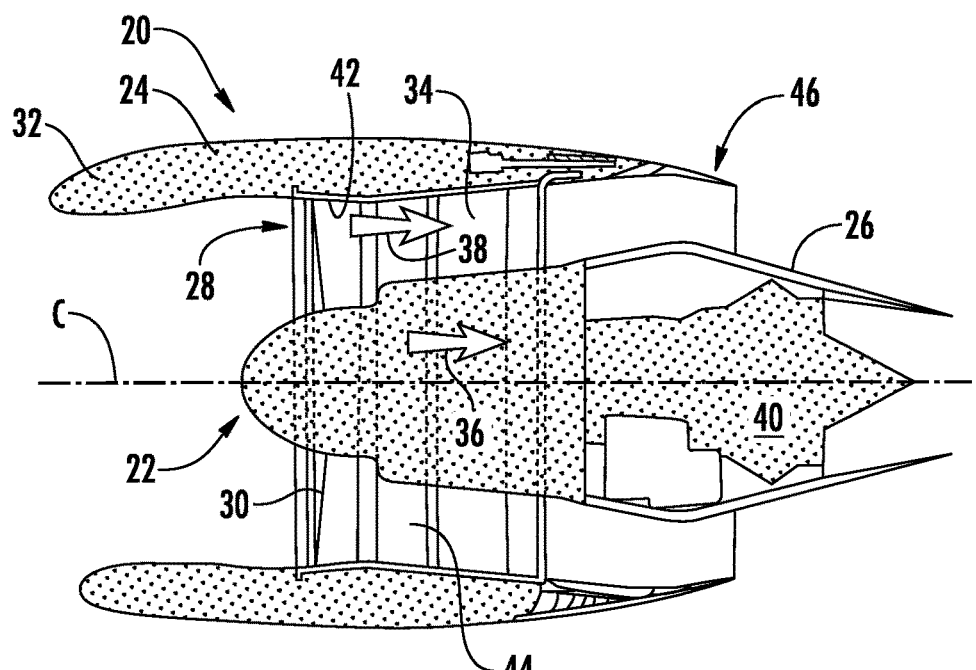
FIG. 2 is a diagrammatic cross section of the turbofan engine.

Referring to FIGS. 1 and 2, a turbofan engine 20 includes an engine core 22 and an aircraft nacelle 24. The engine core 22 may be housed in a core cowl 26. A fan 28 may be mounted adjacent to an upstream end of the nacelle 24, and may include a series of fan blades 30 that rotate about an engine centerline C during engine operation so as to draw a flow of air into an inlet end 32 of the turbofan engine 20. An annular bypass duct 34 is defined between the engine core 22 and the nacelle 24. The airflow drawn into the engine 20 is accelerated by the rotating fan blades 30.

The engine airflow is generally divided into a core airflow (see arrow 36 in FIG. 2) and a bypass airflow (see arrow 38). The core airflow is directed into and through a multi-stage compressor (not shown) within the engine core 22. The core airflow is initially passed through the compressor to increase the airflow pressure, and then the pressurized core airflow is passed through a combustor (not shown), where the air is mixed with fuel and the mixture ignited. The combustion of the fuel-and-air mixture within the combustor causes the air to expand, which in-turn drives a series of turbine stages 40 located toward the rear of the engine 20, to rotate and in-turn provide power to the fan 28.

The bypass airflow 38, accelerated by the rotating fan blades 30, may pass through the bypass duct 34 that may be annular having boundaries defined between the core cowl 26 and a fixed structure 42 that includes a fan case of the fan 28, through a plurality of outer guide vanes (OGVs) 44, and out through a fan nozzle assembly 46. The fan 28 produces a substantial portion of the engine thrust. The core airflow 36 (as a heated exhaust gas from the combustion of the fuel-and-air mixture) is directed out of the rear of the engine core 22 downstream of the turbine stages 40.

Figure 3:
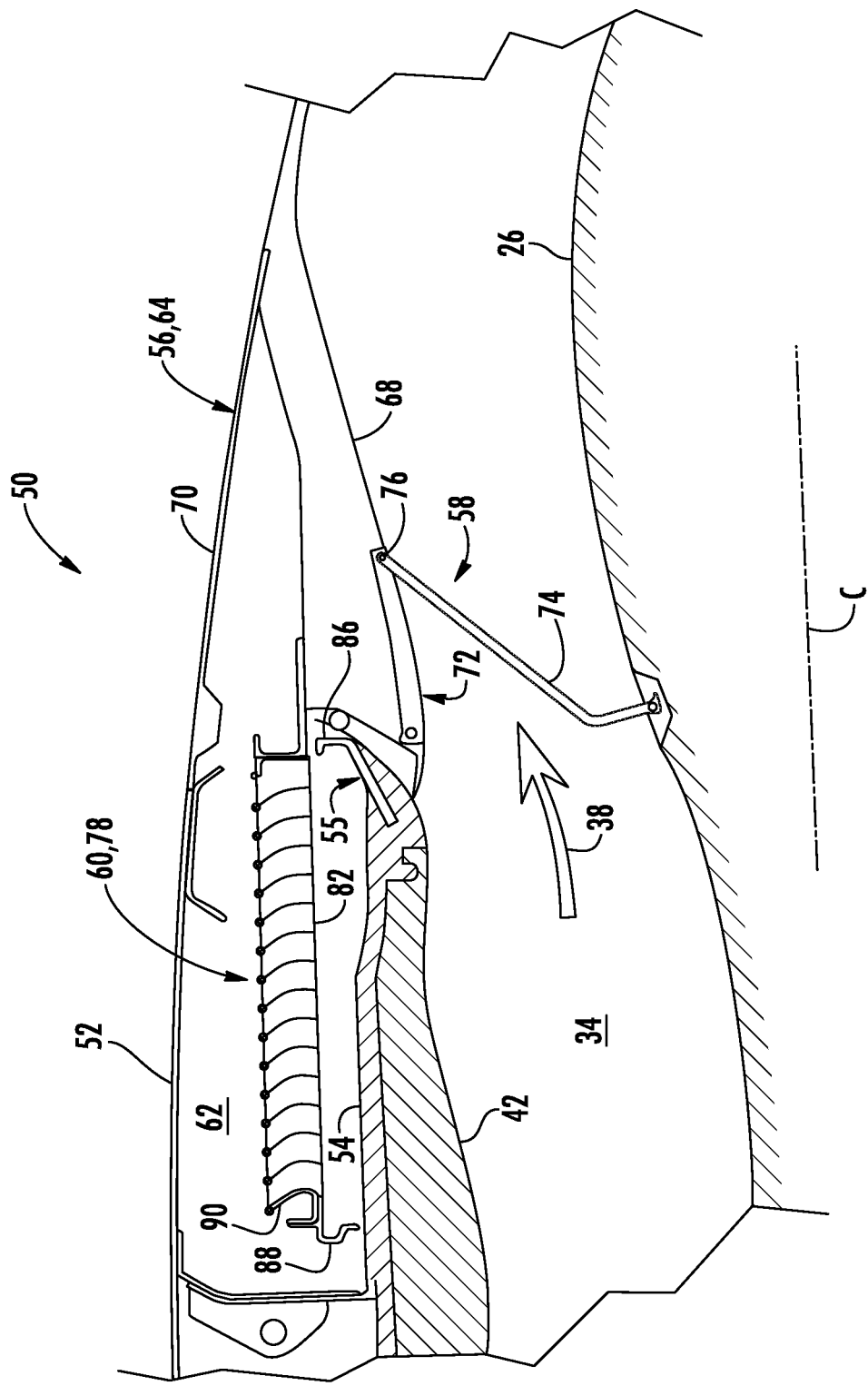
FIG. 3 is a partial cross section of a thrust reverser of the turbofan engine in a stowed state.
Figure 4:
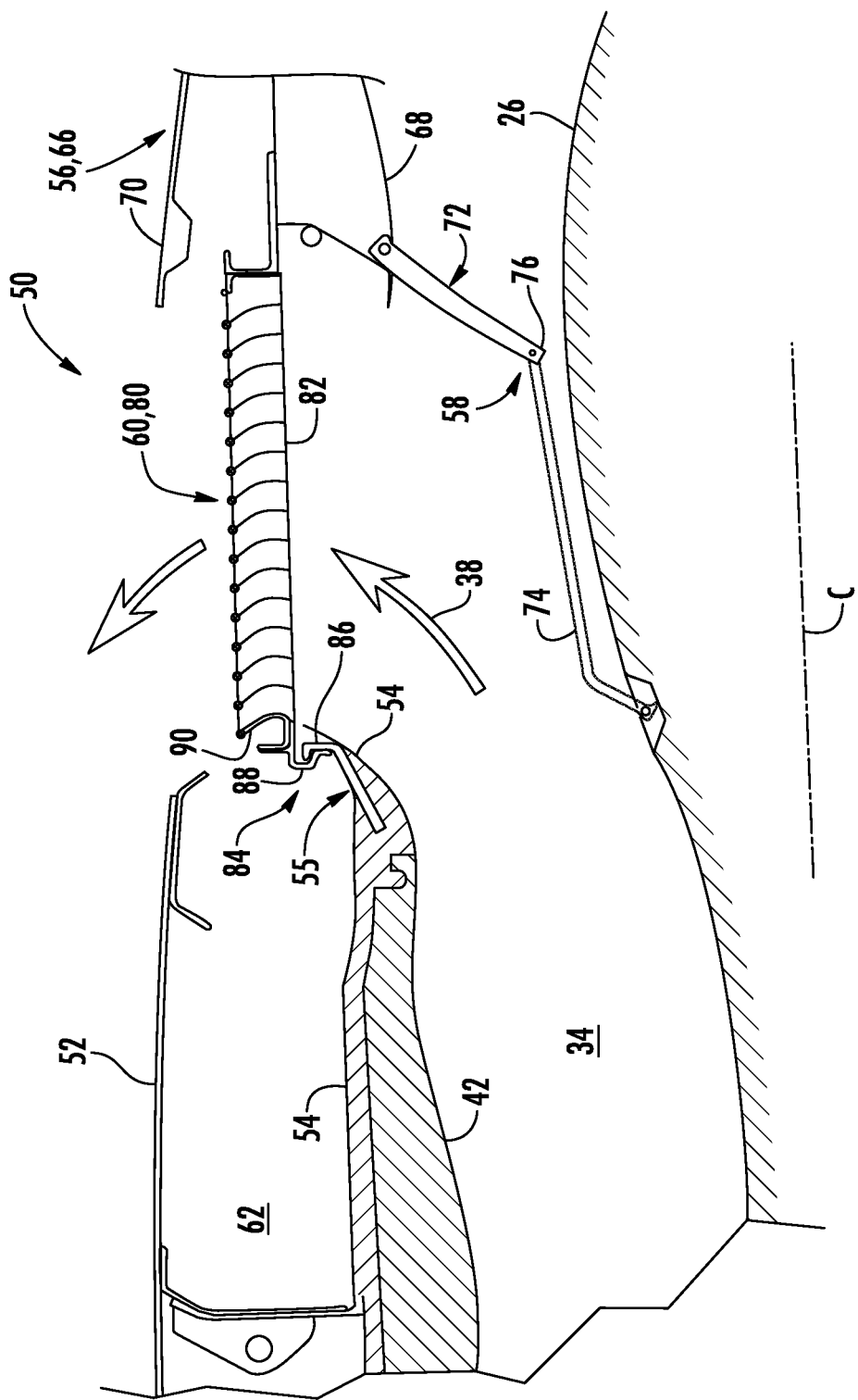
FIG. 4 is a partial cross section of the thrust reverser in a deployed state.

Referring to FIGS. 3 and 4, the aircraft nacelle 24 includes a thrust reverser 50 disposed aft of the OGVs 44 and the fan housing 42, and is configured to redirect the bypass airflow 38. The thrust reverser 50 may optionally include an outer fixed cowl 52, an outer fixed structure (OFS) 54, a translating sleeve 56, a blocker door assembly 58 and a cascade assembly 60. The outer fixed cowl 52 is spaced radially outward from the OFS 54 and may be axially aligned thereto, such that the outer fixed cowl 52 and the OFS 54 define the boundaries of a cavity 62 that may be substantially annular and is open in a rearward or aft direction. The OFS 54 may include a shear web 55 that generally projects axially rearward from the fan case 42. The shear web 55 is spaced radially outward from the core cowl 26. The fan case 42 and the core cowl 26 define the boundaries of a portion of the bypass duct 34. Together, the fan case 42, the OFS 54 and the shear web 55 are a stationary structure with respect to the translating cascade assembly 60.

The translating sleeve 56 is configured to move between a forward position 64 (see FIG. 3) and a rearward or aft position 66 (see FIG. 4). The translating sleeve 56 may include an inner panel 68 and an outer cowl 70 that may be substantially axially aligned to and spaced radially outward from the inner panel 68. The inner panel 68 is spaced radially outward from the core cowl 26 with a portion of the bypass duct 34 being defined therebetween.

The blocker door assembly 58 is configured to deploy and thereby redirect the bypass airflow 38 such that the airflow is redirected from continuing through the bypass duct 34 to the fan nozzle assembly 46 when the translating sleeve 56 is in the aft position 66. The blocker door assembly 58 includes a plurality of blocker doors 72 circumferentially distributed about the centerline C, and may include at least one drag link 74 for each blocker door 72. Each blocker door 72 may be pivotally engaged to the inner panel 68 of the translating sleeve 56. Each drag link 74 may be pivotally engaged and extends between the core cowl 26 and a distal end 76 of the blocker doors 72. In operation, as the translating sleeve 56 moves from the forward position 64 and toward the aft position 66, each blocker door 72 pivots away from the inner panel 68 and into the bypass duct 34 as urged by the drag link 74. When the translating sleeve 56 is in the full aft position 66, the blocker doors 72 are fully deployed and the bypass airflow 38 is diverted through the cascade assembly 60. It is further contemplated and understood that other blocker door configurations may be utilized as part of the present disclosure with and without the use of drag links 74.

The cascade assembly 60 is constructed and arranged to be in a stowed state 78 (see FIG. 3) when the translating sleeve 56 is in the forward position 64, and in a deployed state 80 (i.e., for diverting the bypass airflow 38, see FIG. 4) when the translating sleeve 56 is in the aft position 66. The cascade assembly 60 includes a generally cylindrical cascade 82, a hook device 84 and the shear web 55. The cascade 82 may project axially forward from, and may be rigidly fixed to, the translating sleeve 56. In operation, when the cascade assembly 60 is in the stowed state 78, the cascade 82 is generally located in the cavity 62. When the cascade assembly 60 is in the deployed state 80, the cascade 82 is externally exposed axially between the outer cowls 52,70 and the bypass airflow 38 is diverted substantially radially outward, through the cascade 82, and through a gap axially defined between opposing edges of the outer cowls 52, 70. Although the cascade 82 may be comprised of individual and circumferentially distributed panels that when assembled form a cascade ring, the entire cascade and/or each individual panel extends axially forward from the translating sleeve 56 as one-piece. That is, during operation of the cascade assembly 60 between the stowed and deployed states 78, 80, the cascade 82 does not divide into two separate portions or otherwise reshape itself.

The hook device 84 may include a fixed or stationary catch or hook 86 that may be engaged to the stationary shear web 55 and a translating catch 88 that may be engaged to a forward distal end 90 of the cascade 82. In operation, when the translating sleeve 56 is in the forward position 64, the translating catch 88 is spaced axially forward of the fixed catch 86. When the translating sleeve 56 is in the aft position 66 the catches 86, 88 are mated for the transference of load.

Referring to FIG. 5, when the cascade assembly 60 is in the deployed state 80, axial load (see arrows 92) is imposed by the airflow 38 passing through the cascade 82. The cascades 82 pass the axial load 92 forward to the hook 86 of the shear web 55 that passes it forward to a V-blade 94 that transfers the load to a V-groove 96 that may be carried by the fan case 42. This direct load path may limit axial deflections. Also when the cascade assembly 60 is in the deployed state 80, radial load (see arrows 98) is imposed by the airflow 38 passing through the cascade 82. The cascade 82 passes load 98 in a hoop-wise direction to sliders at diametrically opposite beams (not shown) of the nacelle 24.

Figure 8:
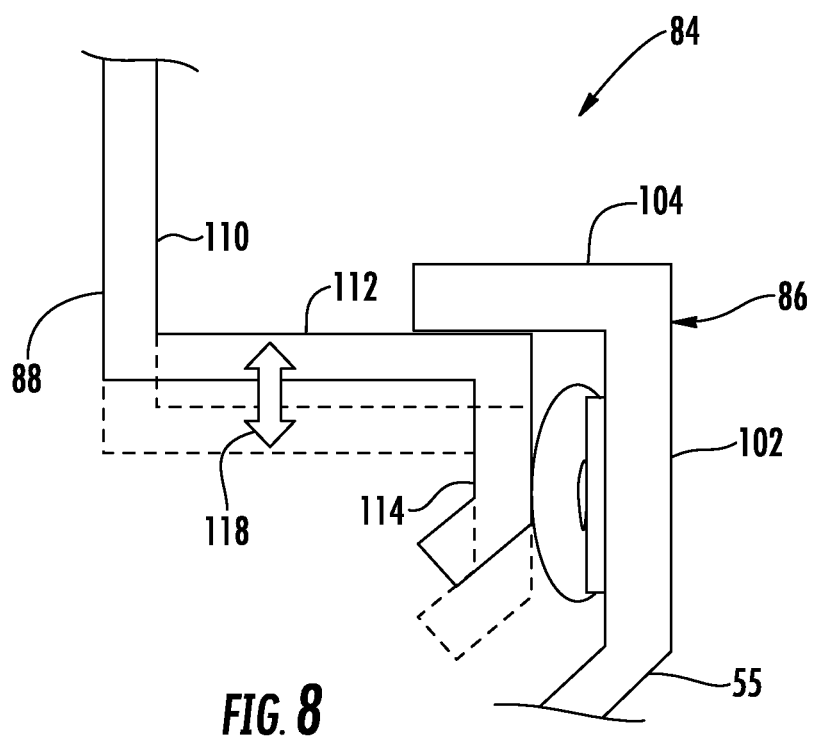
FIG. 8 is a partial cross section of the hook device in the deployed state when fully loaded.

Referring to FIGS. 6 through 8, the hook device 84 may further include a resiliently compliant member 100 that facilitates contact between the fixed half of the hook 86, attached to the shear web 55, and the translating half of the catch 88, attached to the cascades 82, for load transfer when the cascade assembly is in the deployed state 80. The fixed catch 86 may include a first portion 102 projecting radially outward from a rearward end of the shear web 55 and a second portion 104 projecting axially forward from the first portion 102. The first and second portions 102, 104 and the shear web 55 may define a channel 106 opened in an axially forward direction (see arrow 108 in FIG. 6). The resiliently compliant member 100 may be located in the channel 106 and may be engaged to the first portion 102 of the fixed catch 86.

The translating catch 88 may include a first segment 110 that may project radially inward from the cascade 82, a second segment 112 projecting axially aft of the first segment 110, and a third segment 114 projecting radially inward from the second segment 110 such that the third segment 114 is disposed in the channel 106 when the cascade assembly 60 is in the deployed state 60 (see FIGS. 7 and 8).

In operation, when the cascade assembly 60 is in the stowed state 78, the third segment 114 of the translating catch 88 is not in the channel 106. When the cascade assembly 60 is in the deployed state 80, the third segment 114 of the translating catch 88 is disposed in the channel 106 and may be biased against the compliant member 100 for the transmission of loads. Referring to FIGS. 7 and 8, a radial gap (see arrow 116) may be measured between the second portion 104 of the fixed catch 86 and the second segment 112 of the translating catch 88. Gap 116 facilitates a limited degree of deflection (see arrows 118 in FIG. 8) during operation of the thrust reverser before radial loads are carried through the hook device 84.

Figure 9:
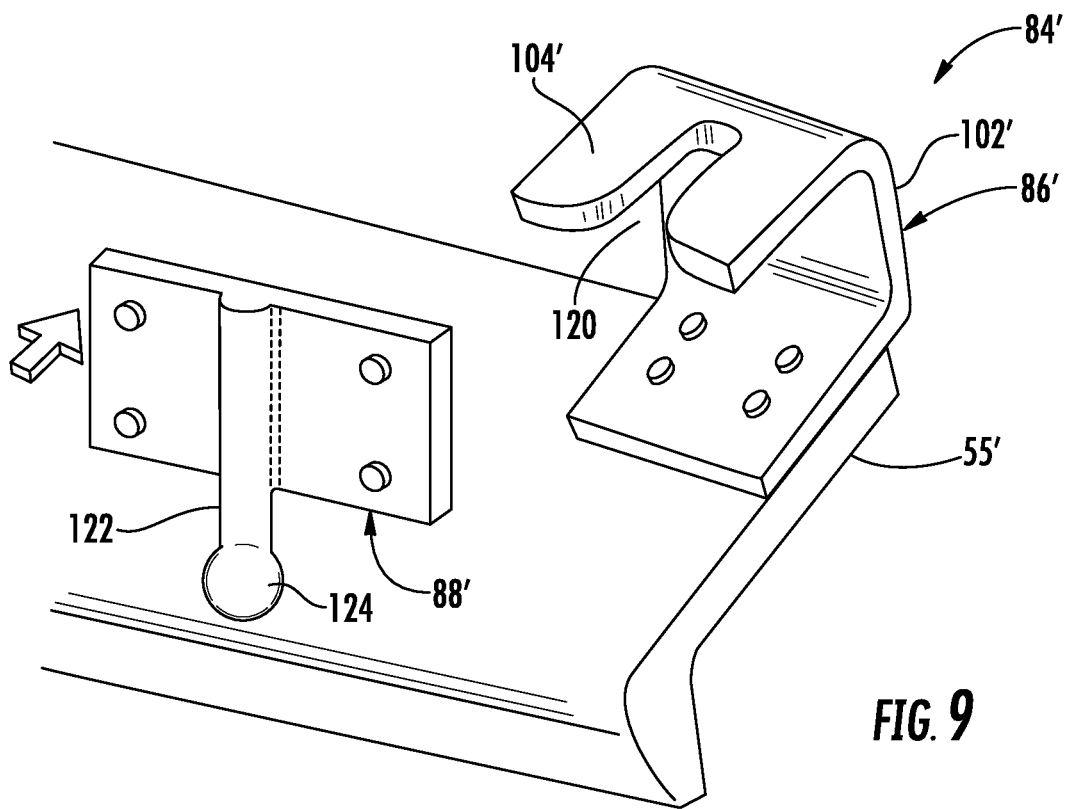
FIG. 9 is a partial perspective view of a second embodiment of a hook device.

Referring to FIG. 9, a second embodiment of a hook device is illustrated wherein like elements have like identifying numerals except with the addition of a prime suffix. A hook device 84' includes a fixed catch 86' and a translating catch 88'. The fixed catch 86' includes a first portion 102' projecting radially outward from a rearward end of a shear web 55' and a second portion 104' projecting axially forward from the first portion 102'. A slot 120 in the second portion 104' may be opened in a forward direction for receipt of the translating catch 88'.

The translating catch 88' may include a neck 122 projecting radially inward from a cascade (not shown) and an enlarged head 124 generally disposed at a distal end of the neck 122. When the cascade assembly is in the deployed state, the neck 122 is in the slot 120. Because the enlarged head 124 is generally larger than a width of the slot 120, the second portion 104' generally captures the enlarged head 124 thus mating the hook device 84'.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

I claim:

1. A cascade assembly of a nacelle for a turbofan engine comprising:
    a one-piece cascade fixed to a translating sleeve constructed and arranged to move between forward and aft positions along a centerline;
    a stationary structure; and
    a hook device including a first catch fixed to the stationary structure and a second catch fixed to the one-piece cascade, and wherein the first catch mates to the second catch for translating load axially when the cascade assembly is in a deployed state and the translating sleeve is in the aft position, wherein the cascade assembly is in a stowed state when the translating sleeve is in the forward position resulting in the second catch being axially spaced forward of the first catch, and the hook device includes a resiliently compliant member disposed between the first and second catches to facilitate axial load transfer when in the deployed state;
    wherein the first catch includes a first portion projecting radially outward from the stationary structure and a second portion projecting axially forward from the first portion, the first and second portions defining at least in-part a channel, and wherein the second catch includes a first segment projecting radially inward from the one-piece cascade and a second segment projecting axially aft of the first segment such that the second segment is disposed in the channel when the cascade assembly is in the deployed state, and wherein the resiliently compliant member is disposed on the first portion.

2. The cascade assembly set forth in claim 1, wherein the stationary structure includes a fan case.

3. The cascade assembly set forth in claim 2, wherein the stationary structure includes a shear web projecting at least in-part axially rearward from the fan case and the first catch is engaged to the shear web.

4. The cascade assembly set forth in claim 1, wherein the resiliently compliant member is engaged to the first catch, is in biased contact with the second catch when the cascade assembly is in the deployed state, and is spaced from the second catch when the cascade assembly is in the stowed state.

5. The cascade assembly set forth in claim 1, wherein the hook device includes the resiliently compliant member disposed axially between the first portion and the first segment.

6. The cascade assembly set forth in claim 1, wherein the first and second catches are circumferentially continuous.

7. The cascade assembly set forth in claim 1, wherein the first and second catches are circumferentially discontinuous.

8. The cascade assembly set forth in claim 1, wherein the one-piece cascade is disposed axially forward of the translating sleeve when the cascade assembly in the stowed and deployed states.

9. A thrust reverser of an aircraft nacelle comprising:
a translating sleeve constructed and arranged to move between forward and aft positions along a centerline;
a blocker door configured to redirect airflow in a fan bypass duct, and wherein the blocker door is deployable when the translating sleeve is in the aft position; and
a cascade assembly including:
a cascade fixed to the translating sleeve,
a stationary shear web, and
a hook device including a first catch fixed to the shear web and a second catch fixed to the cascade, and wherein the first catch mates to the second catch for translating load axially when the cascade assembly is in a deployed state and the translating sleeve is in the aft position, wherein the hook device includes a resiliently compliant member disposed between the first and second catches and adapted to transfer load axially when in the deployed state;
wherein the first catch includes a first portion projecting radially outward from the stationary shear web and a second portion projecting axially forward from the first portion, the first and second portions defining at least in-part a channel, and wherein the second catch includes a first segment projecting radially inward from the cascade and a second segment projecting axially aft of the first segment such that the second segment is disposed in the channel when the cascade assembly is in the deployed state, and wherein the resiliently compliant member is disposed on the first portion.

10. The thrust reverser set forth in claim 9, wherein the shear web projects axially aft from a fan case.

11. The thrust reverser set forth in claim 9, wherein the cascade assembly is in a stowed state when the translating sleeve is in the forward position resulting in the second catch being axially spaced forward from the first catch, and wherein the cascade is disposed axially forward of the translating sleeve when the cascade assembly is in the stowed and deployed states.

12. The thrust reverser set forth in claim 11, wherein the resiliently compliant member is engaged to the first catch, is in biased contact with the second catch when the cascade assembly is in the deployed state, and is spaced from the second catch when the cascade assembly is in the stowed state.

13. The thrust reverser set forth in claim 9, wherein the blocker door is substantially disposed aft of the cascade assembly when the translating sleeve is in the forward and aft positions.

* * * * *